July 7, 1970  R. S. EAGLE ET AL  3,519,396

MEANS FOR INJECTING A GASEOUS REACTANT

Filed Jan. 4, 1968

INVENTORS
Raymond S. Eagle
Lowell D. Fraley
Stanley E. Handman
BY
ATTORNEYS

United States Patent Office 3,519,396
Patented July 7, 1970

3,519,396
MEANS FOR INJECTING A GASEOUS REACTANT
Raymond S. Eagle, New Shrewsbury, Lowell D. Fraley,
 Somerville, and Stanley E. Handman, Metuchen, N.J.,
 assignors to Pullman Incorporated, Chicago, Ill., a corporation of Delaware
Filed Jan. 4, 1968, Ser. No. 695,602
Int. Cl. B01j 1/14; B05b 1/14
U.S. Cl. 23—277
10 Claims

ABSTRACT OF THE DISCLOSURE

A mixer-burner for introducing an oxygen-containing gas into an oxidizable stream which comprises an outer housing and an inner chamber, the gas flowing into the inner chamber through the annulus therebetween, the gas being discharged from the inner chamber into the oxidizable stream through apertures positioned on the face of the burner in perpendicular and angular relationship thereto.

---

Figure 1:
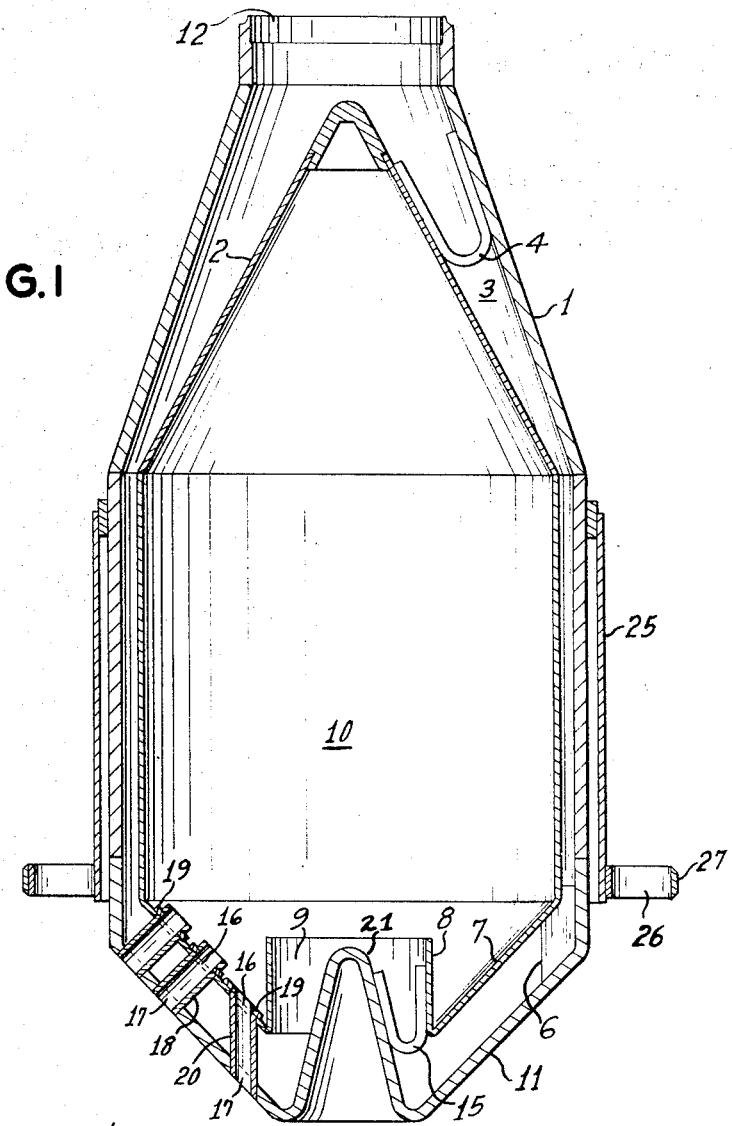

This invention relates to apparatus for mixing gaseous materials. In its more general aspect, it relates to apparatus for introducing gaseous reactants into a reaction zone and thereupon effecting a reaction. In one of its more specific aspects, it relates to a mixer and burner for mixing a gaseous oxygen-containing stream with a gaseous oxidizable stream in a reaction zone.

In the manufacture of gaseous mixtures comprising predominantly nitrogen, hydrogen and carbon monoxide such as a synthesis gas mixture, a partially reformed gas, rich in hydrogen and oxidizable hydrocarbons is caused to react with oxygen at elevated temperatures and superatmospheric pressures. A portion of the necessary oxygen may be supplied in the form of steam or air or mixtures thereof, and the reaction is generally carried out just prior to the entrance of the reactants into a catalyst bed. The reaction is characterized by high temperatures, usually between 1200° F. and about 2800° F., and superatmospheric pressures, usualy about 150 and about 2500 p.s.i.g.

The synthesis gas mixture produced by these reactions is particularly useful in processes such as the production of ammonia or in processes requiring a specific and controlled content of components. In the preparation of such synthesis gas mixtures, it is generally essential that the mixture contain the proper ratio of components and a minimum of unreacted hydrocarbons, carbon dioxide, water vapor and elemental carbon. To insure such controlled and preferred compositions, and to minimize excessively high temperatures resulting from zones of high oxygen concentration, it is essential that optimum mixing of the reactants be obtained and that the reaction be conducted under proper conditions.

There are several important factors involved in properly conducting such high temperature reactions. The reaction zone must be properly located within the reactor and above the catalyst bed contained therein; the reaction zone must be formed of proper stoichiometric proportions of reactants; the apparatus or mixer-burner for introducing the oxygen-containing gas into the reaction zone must be of suitable durability and must avoid introducing extraneous materials into the reaction zone should the apparatus fail.

In the method generally employed, an oxygen-containing gas is introduced into a stream of hydrogen and oxidizable hydrocarbons in a mixing zone superimposed above a bed of catalyst contained with in a reactor. Having obtained optimum mixing of the streams so commingled, the reactants are passed into and through the catalyst bed where subsequent reforming and partial oxidation reactions take place.

As previously mentioned, in order to properly effect the reactions taking place, the reaction zone must be properly located within the reactor and above the catalyst bed therein. Failing in this, the reaction can occur in such close proximity to the catalyst bed as to result in fusion of the upper surface thereof with the result that excessive pressure drop will occur as the reactants pass into the bed. Or, the reaction zone can be otherwise improperly located so as to severely overheat the mixer-burner employed for introducing the oxygen-containing streams into the reactor. Such severe overheating can result in deterioration of the mixer-burner with attendant equipment failure necessitating equipment shut-down. Also, should the mixer-burner employed for introducing the oxygen-containing stream incorporate an extraneous coolant circulating system, deterioration of the equipment can result by introduction of the cooling medium into the reactor.

As mentioned, it is desirable in conducting the reaction that certain proportions exist among the reactants. These quantitative relationships are established by mixing the proper quantities of the reactants in a rapid and thorough manner. If improper relationships are established, improper oxidation can result with the formation of elemental carbon. Such formation is undesirable in that the carbon so formed deposits upon the catalyst, decreases its activity, increases the pressure drop of the gases through the catalyst bed, and increases the space velocity of the subsequent reaction when considered in terms of reducing the quantity of active catalyst available for promoting the reaction in relation to the quantity of reactants.

A further result of the failure to obtain optimum distribution of the preferred proportions between the reactants above the catalyst bed as rapidly as possible relates to the failure of the process to produce optimum product yields. Not only does the previously-mentioned carbon formation result in decreased yields, but the lack of proper proportions of reactants at points within the reaction zone can result in formation of other than optimum yields or optimum ratios in the ultimate product with attendant decrease in ulimate production.

Prior hereto, various solutions have been advanced to alleviate the aforementioned difficulties. None of these have been completely satisfactory, however. Because prior mixer-burners employed have been unsuccessful in properly locating the reaction zone within the reactor as regards proximity of the catalyst bed, resort has been made to locating on the upper surface of the catalyst bed a layer of refractory disposed to asborb the heat of the too closely occurring reaction and so avoid deterioration of the upper surface of the catalyst bed.

Some mixer-burners, or burners, for short, employed for the introduction of the oxygen-containing reactant have permitted the reaction zone to be located so close to the burner that the high temperatures have been destructive thereof. Burners have been employed using more heat-resistant and more costly materials of construction but doing so has generally resulted in only a prolonged period of life for the burner employed rather than the supplying of a positive, lasting solution.

Similarly, coolant circulation systems have been employed for cooling burners used for introducing the oxygen-rich gas. However, such circulating systems are generally expensive, add to the size of the burner, are subject to failure due to problems of maintaining circulation and, in addition, involve the hazard of introducing into the reactor, with deleterious effects, the coolant circulated upon failure of the means being cooled. In addition, heat absorbed by the coolant significantly reduces that available to the desired reactions.

Accordingly, it is an object of this invention to provide a means for carrying out the partial oxidation and reforming of hydrocarbons and carbonaceous materials.

It is another object of this invention to provide a mixer-burner which properly locates a reaction zone within a reactor so as to minimize the reaction both adjacent to the mixer-burner and at the surface of the catalyst bed.

It is a further object of this invention to provide a burner for conducting a reaction, the burner being of such configuration as to avoid deleterious effects from the reaction.

It is still a further object of this invention to provide a burner which has an extended operating life.

Other objects and advantages of the invention will become evident from the following discussion.

These objects are attained by the apparatus of this invention which comprises a housing, an inner chamber disposed within the housing to form an annulus between the inner wall of the housing and the outer wall of the chamber, a passageway communicating between the annulus and the inner chamber and a multiplicity of conduits providing open communication between the inner chamber and the exterior of the housing.

In the apparatus of this invention, the introduction of the oxygen-containing gasiform material to the mixer-burner is made in such a manner as to aid in keeping the mixer-burner cool. This is done by passing the air or air-steam mixture into the burner and across the inner surfaces of those portions of the burner subject to the greatest heat from the reaction. In doing so, the air is preheated but, more importantly, the surface contacted is cooled.

Consistent with the desirability of keeping the burner as cool as possible, several other factors are incorporated in its design. The firing face of the burner is provided with a large area by inwardly coning its surfaces. The multiplicity of ports disposed in the burner face are so positioned as to establish such flow patterns of the reactants across the firing face that burn-back is eliminated. By "burn-back" is meant that tendency of combusting or high temperature gases to flow back in the direction of the discharge ports of the burner where they are entrained by gases discharged from the burner. This causes burning in close proximity to the burner face. This elimination of burn-back is significant in maintaining a cool, and hence long-lasting, burner face.

In order to further minimize the deleterious effect of the heat to which the burner is subjected, it may be desirable to apply certain heat-resistant coatings to the burner.

Figure 2:
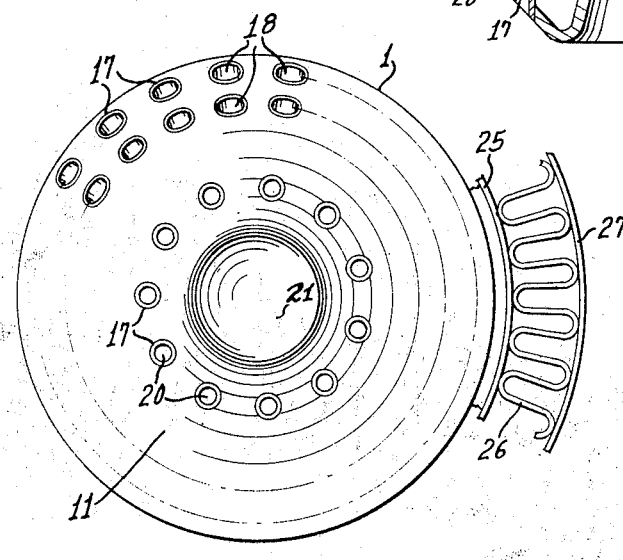

Further understanding of the apparatus of this invention will be had by referring to the drawings in which:

FIG. 1 is an elevation view of the burner; and
FIG. 2 is a bottom view of the burner.

With reference now to FIG. 1, the mixer-burner has outer shell or housing 1 with inlet 12. An inner chamber is formed within outer shell 1, the inner chamber having shell wall 2. Annulus 3 is formed between the inner wall of housing 1 and outer surface of shell wall 2. Inner chamber wall 2 is spaced from outer shell 1 by any number of properly located supports or spacers, for example, top spacers 4, and support spacers 6 and chimney spacer 15. Firing face 11 of the burner outer shell and inner chamber bottom wall 7 are angularly displaced inwardly toward the center-line of the burner with bottom wall 7 being angled upwardly to form chimney 8 and firing face 11 being angularly disposed conically inward opposite to the direction of the flow of the gas into the burner to form port 9 into chamber 10.

Inner chamber bottom wall 7 and firing face 11 contain apertures 16 and 17, respectively. Tubes 18 and 20 provide open communication between chamber 10 and the external of chamber 1. Tubes 18 extend through apertures 16 and 17, and are disposed perpendicular to angularly disposed firing face 11. Tubes 20 extend through apertures 16 and 17 and are parallel to the vertical centerline of the burner. Collars 19 facilitate securing tubes 18 and 20 in inner chamber bottom wall to allow for expansion while all tubes may be welded in firing face 11 of the burner in order to prevent leaking of the gaseous materials from annulus 3 to exterior of the burner.

The apparatus of this invention is most suitably installed in a duct with the hydrocarbon-containing gas being introduced in such a manner as to flow down and around the burner-mixer and envelop it. The duct in which the burner is installed is accordingly only slightly larger in diameter than the burner. To further facilitate proper mixing of the hydrogen-containing gas introduced through the duct and the oxygen-containing gas introduced through the burner, there may be provided affixed to and exterior of burner outer shell 1 shroud 25 carrying as its lower extreme, distribution grid 26 which facilitates centering the mixer-burner in the hydrogen-containing gas inlet duct.

As will be seen from FIG. 2, grid 26 can be formed between shroud 25 and grid wall 27 to effect a series of baffles which facilitates the distribution of the hydrogen-containing gas around the burner so as to envelop it.

In the operation of the apparatus of this invention, with the hydrocarbon gas flowing around the burner outer shell 1, the oxygen-containing gas is admitted through inlet 12 and flows down around inner chamber 10 through annulus 3, thus tending to cool the inner surface of burner outer shell 1. The gas flows down the annulus 3, and up through chimney 8 into inner chamber 10. From inner chamber 10, the gas flows through tubes 18 and 20 and is emitted from the burner.

Chamber 10 is not of a particular size in respect to the volume of burner outer shell 1. Instead, chamber 10 is formed with consideration being given to the flow area of annulus 3.

Burner firing face 11 and inner chamber bottom wall 7 are disposed angularly to the vertical sides of the burner in order to provide for the positioning of the tubes in the firing face of the burner. These tubes or conduits which provide communication for the reactants between the inner chamber 10 and the exterior of the housing into the envelope of hydrocarbon-containing gas which envelops the burner may be arranged in concentric circles. Tubes 18 discharge perpendicularly to the angularly disposed firing face 11 while tubes 20 in the innermost row discharge vertically downward parallel to the center-line of the burner. By means of such an arrangement, burn-back against the face of the burner is minimized. It is preferred that approximately ten percent of the gas emitted from the burner pass through those tubes discharging downward parallel to the centerline of the burner. In respect to the velocity of the emitted gases, it is similarly preferable that the discharge velocity of the gases from tubes 18 and 20 be approximately equal to, or greater than, that of the hydrogen-containing gases flowing down around the burner and that the gases emitted through tubes 18 and 20 from the burner be at a velocity sufficient to establish a pressure drop which prevents backflow through the tubes.

The firing face 11 of the burner is angularly disposed, at its central portion, conically inwardly opposite to the direction of the flow of the gas into the burner to form a conical shaped segment 21. This configuration of firing face 11 aids in avoiding recirculation of the gases with attendant burn-back across face 11 of the burner and acts to increase the area of the firing face. This results in greater surface exposure to the cooling effects of the gas and to a decrease in heat intensity on the burner face in terms of surface area per unit of heat radiated. Both decrease the likelihood of burner burnout and lower the temperature at which burner face 11 operates.

To further protect the firing face of the burner from high temperature deterioration, it may be desirable to add a protective coating thereto. A coating found to be particularly effective is one comprising a series of layers of successively increasing zirconia content from about 35% for the first applied coat to about 100% for the finally applied coat.

The inner chamber wall can be fitted with an expansion joint to compensate for the temperature differentials encountered. More or less than the number of rows of tubes shown discharging from the inner chamber can be provided.

Having described our invention, we claim:

1. An apparatus for introducing a gaseous reactant into a reaction zone which comprises:
    a walled housing having an inlet at one end, one wall at the opposite end of said housing forming a firing face inwardly disposed with respect to adjacent walls of the housing and extending away from the housing inlet;
    an inner chamber spaced within said housing to form an annulus therebetween, said annulus providing communication between said inlet of the housing and a passageway to the inner chamber, said passageway being adjacent to the firing face;
    a plurality of conduits providing communication between the inner chamber and the exterior firing face of the housing and passing through said annulus; and
    means for attaching the outer housing to the reaction zone.

2. The apparatus defined in claim 1 in which said inwardly disposed firing face has formed centrally thereto an inwardly coned section extending towards said passageway.

3. The apparatus defined in claim 1 in which a portion of said conduits are disposed perpendicular to said firing face and a portion of said conduits are disposed parallel to the longitudinal centerline of said housing.

4. The apparatus defined in claim 1 in which an expansion joint is formed in the walls of said chamber.

5. The apparatus defined in claim 1 in which said firing face is coated with at least one layer comprising zirconia.

6. The apparatus defined in claim 1 in which said housing has affixed circumferentially and externally thereto a distribution grid.

7. The apparatus defined in claim 1 in which said conduits are disposed in concentric circles around the firing face of the burner.

8. The apparatus defined in claim 1 in which the passageway communicating between said annulus and said inner chamber is formed by an upward angulation of the bottom wall of the inner chamber.

9. The apparatus defined in claim 3 in which the conduits are arranged in concentric circles with the conduits of the inner circle being disposed parallel to the vertical centerline of the burner.

10. The apparatus defined in claim 9 in which the conduits of at least one of said circles are disposed parallel to the vertical centerline of the burner and the conduits of at least one of said circles are disposed perpendicular to the firing face of the burner.

References Cited

UNITED STATES PATENTS 3,057,707  10/1962  Braconier et al. _____ 48—196

JAMES H. TAYMAN, Jr., Primary Examiner

U.S. Cl. X.R.

23—284; 48—196, 197; 137—604; 239—427, 558; 431—8, 11, 242, 354